US010079767B2

(12) United States Patent
Bosch et al.

(10) Patent No.: US 10,079,767 B2
(45) Date of Patent: Sep. 18, 2018

(54) MULTI-MOBILE CORE NETWORKS AND VALUE-ADDED SERVICES

(71) Applicant: CISCO TECHNOLOGY, INC., San Jose, CA (US)

(72) Inventors: Hendrikus G. P. Bosch, Aalsmeer (NL); Jeffrey Napper, Delft (NL); Alessandro Duminuco, Milan (IT); Humberto J. La Roche, Ocean, NJ (US); Surendra M. Kumar, San Ramon, CA (US); Aeneas Sean Dodd-Noble, Andover, MA (US); Anil Kumar Chandrupatla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 15/181,159

(22) Filed: Jun. 13, 2016

(65) Prior Publication Data

US 2017/0359265 A1 Dec. 14, 2017

(51) Int. Cl.
*H04L 12/851* (2013.01)
*H04L 12/801* (2013.01)
(Continued)

(52) U.S. Cl.
CPC ........ *H04L 47/2441* (2013.01); *H04L 45/586* (2013.01); *H04L 47/125* (2013.01); *H04L 47/14* (2013.01); *H04L 67/2842* (2013.01)

(58) Field of Classification Search
CPC ... H04L 47/2441; H04L 47/125; H04L 47/14; H04L 45/586; H04L 67/2842
See application file for complete search history.

(56) References Cited

U.S. PATENT DOCUMENTS

| 7,376,125 B1* | 5/2008 | Hussain | H04L 45/00 370/352 |
| 2012/0224578 A1* | 9/2012 | Mih Ly | H04L 12/4633 370/392 |

(Continued)

OTHER PUBLICATIONS

A. Farrel, et al., "Encoding of Attributes for MPLS LSP Establishment Using Resource Reservation Protocol Traffic Engineering (RSVP-TE)," Network Working Group, RFC 5420, Feb. 2009, 22 pages; https://www.rfc-editor.org/pdfrfc/rfc5420.txt.pdf.

*Primary Examiner* — Jamal Javaid
(74) *Attorney, Agent, or Firm* — Patterson + Sheridan, LLP

(57) ABSTRACT

A method is provided in one example embodiment and includes receiving at a network element a packet associated with a flow and determining whether a flow cache of the network element includes an entry for the flow indicating a classification for the flow. The method further includes, if the network element flow cache does not include an entry for the flow, punting the packet over a default path to a classifying service function, in which the classifying service function classifies the flow and determines a control plane service function for handling the flow, and receiving from the classifying service function a service path identifier ("SPI") of a service path leading to the determined control plane service function. The flow is subsequently offloaded from the classifying service function to the network element.

20 Claims, 6 Drawing Sheets

(51) Int. Cl.
*H04L 12/803* (2013.01)
*H04L 29/08* (2006.01)
*H04L 12/713* (2013.01)

(56) References Cited

U.S. PATENT DOCUMENTS

| | | |
|---|---|---|
| 2014/0351452 A1 | 11/2014 | Bosch et al. |
| 2015/0281125 A1* | 10/2015 | Koponen ................ H04L 45/64 711/122 |
| 2015/0334027 A1 | 11/2015 | Bosch et al. |
| 2015/0334595 A1 | 11/2015 | Bosch et al. |
| 2016/0099864 A1 | 4/2016 | Akiya et al. |
| 2016/0119253 A1 | 4/2016 | Kang et al. |
| 2017/0093677 A1* | 3/2017 | Skerry ................... H04L 43/12 |

\* cited by examiner

MULTI-MOBILE CORE NETWORKS AND VALUE-ADDED SERVICES

TECHNICAL FIELD

This disclosure relates in general to the field of communications networks and, more particularly, to a technique for implementing multi-mobile core networks and value-added services in such communications networks.

BACKGROUND

In today's Mobile Packet Cores ("MPCs"), all functions relevant to signaling and data plane processing are incorporated into a single monolithic MPC. These MPCs often manage subscriber data in one or more functional elements and complement these with signaling plane and data plane routing functions for terminating mobile calls. As a result, such MPCs are inherently centralized: the functional element performs all work related to mobile processing for the set of subscribers. Consequently, all data plane traffic is treated equally by an MPC.

Differentiation of MPC service for subscribers and their flows typically only occurs inside the MPC. Deep Packet Inspection ("DPI") is often first employed on data packets by an MPC to identify what functions are needed for the flow. Once identified, the appropriate functions are selected for fielding the data call; however, by the time the DPI functions execute, the packet is already routed to a particular MPC, at which point easy specialization of service is no longer possible.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving at a network element a packet associated with a flow and determining whether a flow cache of the network element includes an entry for the flow indicating a classification for the flow. The method further includes, if the network element flow cache does not include an entry for the flow, punting the packet over a default path to a classifying service function, in which the classifying service function classifies the flow and determines a control plane service function for handling the flow, and receiving from the classifying service function a service path identifier ("SPI") of a service path leading to the determined control plane service function. The flow is subsequently offloaded from the classifying service function to the network element.

Example Embodiments

In accordance with features of embodiments described herein, a switching point (or virtualization point) is provided for signaling (i.e., control) and data flows that enables dynamic classification and load balancing of 3GPP signaling/control and data plane traffic and individually routing of mobile traffic to signaling and data plane functions for specific use cases under certain conditions. Such routing optimization leads to better utilization of functional elements since traffic is sent directly to the appropriate functions without first being routed to a particular MPC's selection function. Moreover, by using transient information for steering traffic, dynamic decisions can be made more easily. An example of this may include off-loading voice/data calls to fast path processing when an existing MPC is overloaded. Ultimately, these optimizations lead to cost reductions for mobile services delivery.

In accordance with features of certain embodiments, basic packet forwarding is separated from MPCs and forwarding elements ("FEs") host one or more MPCs akin to Multi-Operator Core Networks ("MOCNs"). Simple, inexpensive, high performing mobile data plane FEs are employed and are configured to route traffic to one or more MPCs (each of which is optimized for a specific use case) under control of a classifier and load balancer. Each FE provides basic connectivity between a Radio Access Network ("RAN") and the Internet and/or enterprise networks and maintains connectivity to one or more MPCs to program routes into an FE and connectivity to MPC data plane functions for slow path and value added operations. Each FE also provides a platform to host fast path functionality for off-loaded MPC flows in the FE itself using a virtual presence of the MPC. In other words, the FE enables MPCs to control part of the FE for its connectivity services; MPCs are granted virtual access to an FE potentially co-located with other MPCs.

Figure 1:
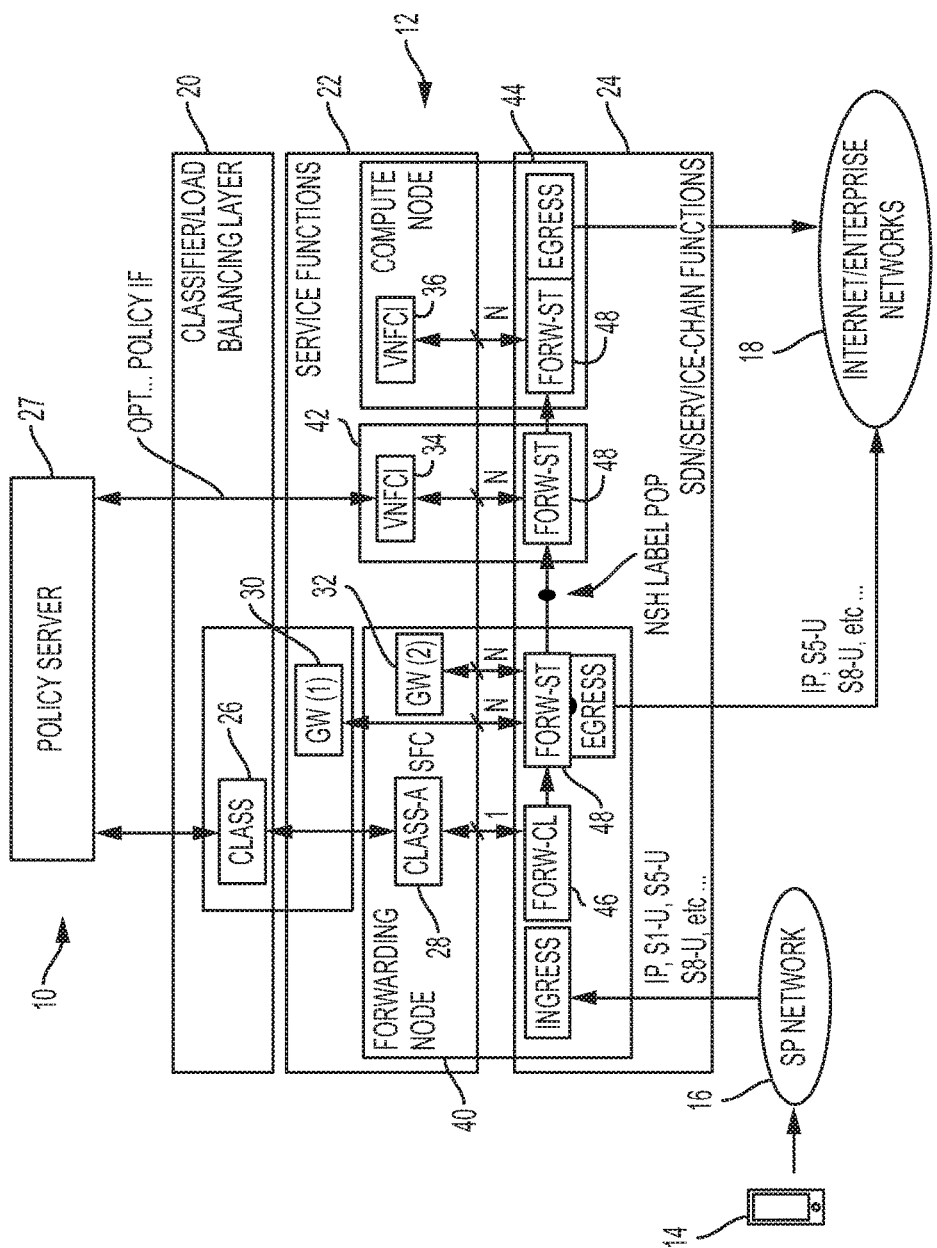
FIG. 1 is a simplified block diagram illustrating forward path handling in accordance with embodiments described herein for implementing multi-mobile core networks and value added services.

FIG. 1 illustrates a block diagram of a system 10 that may use physical or virtualized resources and may be deployed in cloud-computing or data-center environments, in accordance with implementing embodiments described herein. In particular, FIG. 1 illustrates a manner in which system 10 may include an MPC 12 for handling processing of traffic from a mobile device 14 via a service provider (SP) network 16 to the Internet and/or enterprise networks 18, as well as from the Internet and/or enterprise networks to the mobile device via SP network. There are typically many millions of subscribers whose traffic is handled by the mobile packet core network, and only one subscriber is shown as an example. In FIG. 1, should be understood that there may be more than one ingress network providing connectivity to access networks (e.g., APNs, Multi-Operator Core Network ("MOCN"), network slicing, Dedicated Core ("DECOR")) and more than one egress networks connecting the service provider network to enterprise networks or vice versa.

As shown in FIG. 1, the MPC 12 may include three logical layers, including a classifier/load balancing layer 20, a service functions layer 22 and a service chaining layer 24. The classifier/load-balancing layer 20 enforces policies, obtained from a policy server and bridges, or "translates" those polices to the service-chaining layer 24. The service functions layer 22 provides the service functions associated with the MPC 12. The service chaining layer 24 implements the service chains. It is noted that the service functions may be virtual (software running in a data center) or separate physical entities, and the use of "virtual" in describing various entities shown in the figures is not meant to be limiting.

The classifier/load balancing layer 20 may include a classification node ("CLASS") 26. CLASS node 26 may interface with a policy server, e.g., a Policy Charging and Rules Function ("PCRF"), 27 and push policies to the service-chaining layer 24. CLASS node 26 may be extended with an agent ("CLASS-A") 28 to aid in service chain programming. The service functions layer 22 includes gateway ("GW") functions. It should be understood that a GW may came in various forms and that multiple instances of the same type can co-exist. A GW may be implemented as a traditional packet gateway (e.g., S- and/or PGW and/or SAE-GW) instance, such as is the case for GW(1) 30, or it may be a highly optimized data path for PGW functions, as is the case for GW(2) 32. It should be understood that the user plane function of a split control/user-plane function can just as easily be supported with this architecture. Alternatively, both GW(1) 30 and GW(2) 32 may implement SGW and PGW functionality in various other forms and optimized for specific use cases (e.g., to support network slicing, or IoT). It should be understood that GW(1) 30 and/or GW(2) 32 may provide line termination functions for other access technologies, such as, but not limited to cable access, Wi-Fi wireless network access and more. Moreover, value-added (Gi-LAN and/or mobile packet core auxiliary) service functions (e.g., virtual Networking Function Container ("vNFC") 34, 36, may also be resident in the layer 22. A forwarding node 40, a compute node 42, and an egress compute node 44 may also be provided to provide mobile services. Packet forwarding nodes may be special purpose forwarding nodes or standard compute nodes and various configurations are supported.

Forwarding functionality identified in FIG. 1 by numerals 46 are provided in two forms: flow classifiers (FORW-CL) as identified by numeral 46 to associate service chain labels to bearers and/or flows and steering entities (FORW-ST) 48. The FORW-CL entity 46 handle ingress traffic and egress processing id handled by FORW-ST. Every incoming packet for a particular flow is first assigned a service chain label stack by FORW-CL and then steered through the specific service chain path(s). A default service-chain exists for bearers and/or flows for which FORW-CL 46 cannot provide a service chain label. This default service chain leads to the optional CLASS-A 28 or CLASS 26, in case CLASS-A is not deployed.

The CLASS 26, the optional CLASS-A 28 and FORW-CL 46 jointly provide classification and load balancing function. CLASS-A 26 serves as a policy cache co-located with the forwarding node 40 for performance reasons and it informs FORW-CL 46 of the assigned service chain label stack for a bearer and/or flow. CLASS 26 interfaces with PCRF to obtain subscriber policy state and combines this with its knowledge of the mobile services; in other words, CLASS is the main classifier/load balancing entity. In one embodiment, once CLASS has made a classification and load balancing decision for a subscriber's traffic, if CLASS-As are deployed, it informs all CLASS-As in the system of that classification and load balancing decision. Especially when the solution is combined with Equal Cost Multipath ("ECMP") flow distribution from the data-center router, regardless how a bearer and/or flow is ECMP load-balanced for a subscriber, all CLASS-As classify and load balance the subscriber bearer and/or flow identically without requiring communication with CLASS. FORW-CL efficiently maps bearers and/or flows to earlier classified. In case a new bearer and/or flow enters the system, or when FORW-CL has no knowledge of the specific bearer and/or flow, it interacts with CLASS/CLASS-A to obtain the service chain label stack. In case CLASS-As are not deployed, FORW-CL interacts directly with CLASS. It can be assumed hybrid models FORW-CL with and without CLASS-As are supported as well.

Figure 2:
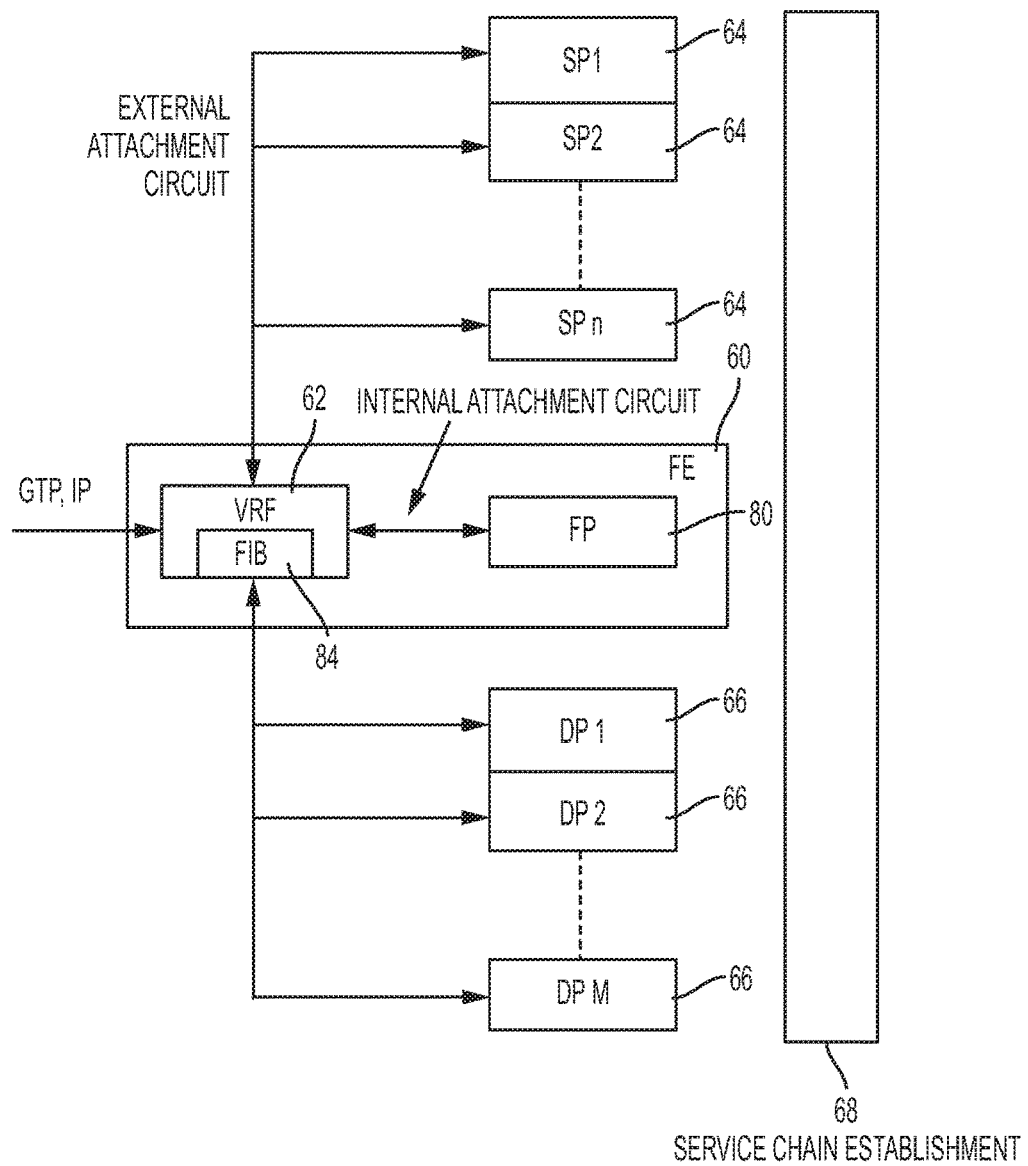
FIG. 2 is a simplified block diagram illustrating an overview of signaling- and data-plane functions of a forwarding element in accordance with embodiments described herein for implementing multi-mobile core networks and value added services.
Figure 3:
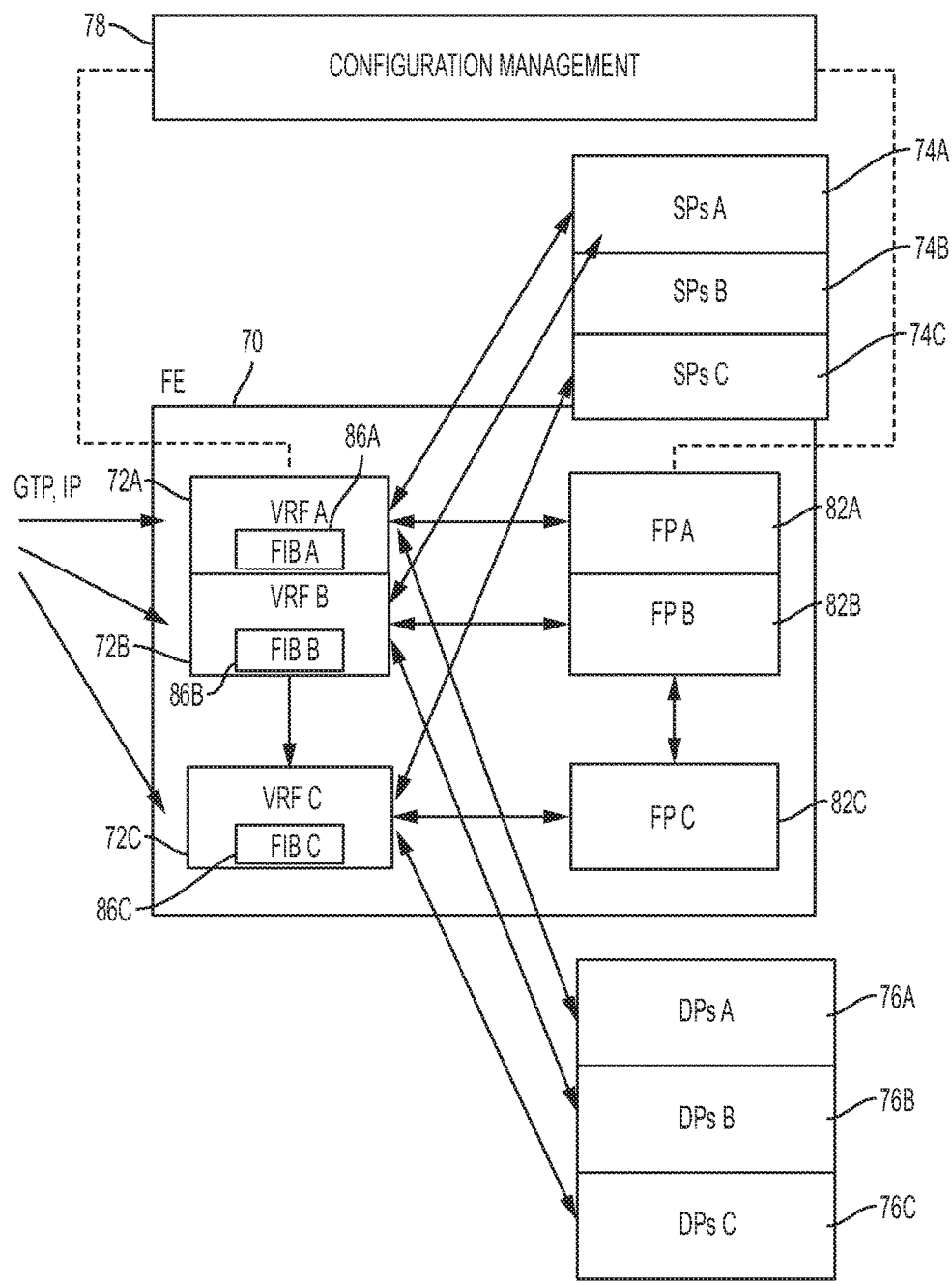
FIG. 3 is a simplified block diagram illustrating use of a forwarding element to support multiple MPCs in parallel in accordance with embodiments described herein for implementing multi-mobile core networks and value added services.

In accordance with features of embodiments described herein, and as illustrated in FIGS. 2 and 3, two types of elements, or entities, are introduced into a mobile network: a Signaling Plane ("SP") (or Control Plane ("CP")) entity and a Data Plane ("DP") entity. For example, in the case of a 4G LTE network, SGW-C and SGW-U are SP entities and PGW-C and PGW-U are DP entities. An MME element is already a SP only element. All of these elements are anchored on an NSH service chain, as described in IETF RFC 7665 entitled "Service Function Chaining (SFC) Architecture" (hereinafter "RFC 7665"), and anchored at an FE. In certain embodiments, SP elements interact with FEs to establish mappings for data and signaling flows. SP elements establish bearer and/or flow associations towards DP elements for data plane flows and a SP load balancer, likely one of the existing SPs, establishes bearer associations towards SP elements for signaling-plane flows. The association may be an N-tuple mask that may include the GTP TEID onto a particular NSH Service Path Identifier ("SPI"). The association of data packets to SPIs is referred to herein as classification.

FIG. 2 is a simplified block diagram of a portion of a network for implementing features of one embodiment. In particular, FIG. 2 illustrates an overview of signaling- and data-plane functions of an FE 60. As shown in FIG. 2, ingress data arrives at the FE 60 by way of GTP or IP in an input VRF 62, which classifies traffic over SP entities 64 and DP entities 66. The FE 60 classifies the incoming traffic to an SPI, which connects to the appropriate (virtual) instance of the SP or DP. The actual establishment of the service chains itself is based on a Service Chain Establishment module 68, which may be implemented as a controller that orchestrates the availability of service chains. In European Telecommunications Standards Institute ("ETSI") Network Functions Virtualization ("NFV") terminology, these functions may form a part of an NFV Orchestrator ("NFVO") or VNF-M and execute whenever new instances of SP or DP entities are created, or when SP or DP entities are cancelled. FIG. 2 illustrates instantiation of a single MPC in a system. As shown in FIG. 2, the FE 60 also functions as a virtual data plane switch for an MPC. It provides a multiplexing point toward one or more signaling plane instances 64 and/or data plane instances 66.

FIG. 3 is a simplified block diagram of a portion of a network for implementing features of one embodiment. In particular, FIG. 3 illustrates use of an FE 70 to support multiple MPCs in parallel. As illustrated in FIG. 3, incoming traffic is split over multiple VRFs 72, each of which can connect to corresponding SP entities 74 and DP entities 76. To implement this feature, the FE 70 identifies itself through multiple IP addresses towards the RAN to enable the RAN to connect to it, enabling each MPC to maintain its own 32-bit TEID space, and maps, by way of attachment circuit downlink traffic, to the appropriate one of the VRFs 72. A configuration manager aids in the establishment of each of the MPCs on FEs similar to service chain establishment inside a MPC. In accordance with features of embodiments described herein, multiple IP addresses are used on the same FE for identifying which MPC needs to be considered.

Each use case is tied to a VRF inside the FE and the corresponding SP entities/DP entities are addressed through that VRF. The configuration manager manages the VRFs and is typically integrated into an OSS. A configuration management module (or configuration manger) 78 may use ETSI NFV functions to dynamically create virtualized service functions. A use case profit's services over the infrastructure. Use cases may include, but are not limited to, C-IoT, M2M, regular consumer traffic, etc. Embodiments described herein address segregation of traffic for use case inside a generally available SDN layer and the FE represents a packet forwarder of such an SDN layer. As illustrated in FIG. 3, an FE, such as FE 70, maintains one or more VRFs, such as VRFs 72, to segregate traffic between the various use cases. Each VRF 72 has a private loopback address and/or attachment circuit. If an attachment circuit is shared, the loopback address must be unique for each VRF sharing the attachment circuit.

The FE 70 may be an independent entity, such as a utility, that may be used for connectivity services for one or more mobile service providers with MOCN-like procedures and functionality. Each of these (virtual) mobile service providers may support one or more MPCs themselves for their services. In this manner, the FE is used as a multi-provider multi-packet core switching point.

To support flow offload services for MPCs, in certain embodiments an FE may host MPC-provided fast path ("FP") connectivity for optimized data plane services. In this case, virtual entities (such as containers, processes, and/or QEMU-based virtual machines) comprising FP functional elements (designated by reference numeral 80 in FIG. 2 and by reference numeral 82 in FIG. 3) may be installed on the FE 60/70 to support fast path data services. On ingress, an MPC can select, on a flow-by-flow and/or bearer-by-bearer basis, which of the mobile calls is served by the FP 80/82 at the FE 60/70 itself without being routed to the (traditional) MPC at all. Again, this selection is based on classifying bearers and/or flows onto the appropriate NSH service chain by way of the SPI.

In accordance with features of certain embodiments, functions on the slow path and the fast path may be explicitly mixed and matched. For instance, if a fast path function includes a "lawful interception" function while a more elaborate "charging" function is included in the slow path, a service chain can be established that strings these functions together. An NSH SPI identifies such service chains. To aid the FE in its role of classifying ingress flows, MPCs send steering records (or policies) into their FEs.

These policies inform the classifier how to assign bearers and/or flows to SPIs. Steering policies are created during initial establishment of calls and can further be updated during the call. These steering records may be simple, such as a single GTP TEID mapping onto a specific SPI, or may be elaborate, describing how traffic needs to be classified destined to certain addresses and/or for certain protocol types and/or during certain transient conditions. In general, the classifier maps a Traffic Flow Template ("TFT") onto an SPI. Steering policies are managed by the SP functions of the MPC, and each MPC can enforce its own policies. The prime advantage of downloading such steering policy records directly into the FE is to avoid continuous interactions between FE and SP for classification purposes. It is possible to download a steering policy record once the FE to offload the classification process to the FE altogether.

Once bearers and/or flows have been classified by the FE, the FE will typically maintain the classification decision in a Forwarding Information Base ("FIB") for the duration of the bearer and/or flow. MPC use cases include MPC systems specific for mobile virtual operators, machine-to-machine and internet-of-things functions, traditional MPCs, voice-only operations, data-only-always-on service, and others. A variety of implementations of MPCs may be used, including but not limited to, StarOS, Affirmed, Connectem, and others.

Currently, neither MOCN nor Mobile Virtual Network Operator ("MVNO") support split control/data plane, fast path operations or functionality for dynamic call steering. Embodiments described herein support such functionality, as well as alternative use cases that separate IP anchor and mobility anchor, allowing the state in the mobility anchor to be maintained, while the IP anchor is more stateless. This allows the FE to be located in places that require a simple set up and all control interfaces can be concatenated into one.

As previously noted, certain embodiments implement a method to realize supporting multiple MPCs simultaneously on an FE. The FE maintains a per-VRF Forwarding Information Base ("FIB") (designated by reference numeral 84 in FIG. 2 and by reference numeral 86 in FIG. 3) that is used to map incoming traffic onto a (GTP-packet carrying) service chain identified by its SPI. Every incoming packet is matched against the FIB and when a match is found, the packet is wrapped in NSH and forwarded over the appropriate service chain, identified by an SPI, towards one or more service components. If a packet "misses" in the FIB (meaning a match is not found), the FE has a mechanism (which may be implemented as a classifier) to resolve the appropriate service chain. The classifier uses the aforementioned steering records to derive the SPI for a bearer and/or flow. Once classified, the bearer/flow mapping to the SPI is submitted to the FIB.

In certain embodiments, a catchall steering policy record may be used for unclassifiable traffic. This catchall may be used for steering traffic to an SP-load balancer for initial assignment of bearers onto an SP entity and/or FE. For instance, such a catchall may describe how to steer traffic for GTP TEID 0. Such traffic is first routed to the appropriate load balancing SP (e.g., a PGW-C load balancer), which can then forward the traffic, internally, to the appropriate SP (i.e., PGW-C). This SP then selects the appropriate anchor for the data plane (i.e., FE), the appropriate DP (i.e., PGW-U) for slow-path functions, the appropriate FP functions for the subscriber (if needed), and informs the selected FE of the appropriate steering policies for the subscriber. When all is established, the SP (PGW-C) may respond to the subscriber call through standard signaling means.

To manage its service chains, the FE maintains a series of tables listing addressing information for the services hosted on the service chain. If a service chain has multiple services anchored thereto (e.g., one or more fast path services and one or more slow path services), the FE maintains tables to route the traffic through services one-by-one. Such service chains are established on a per-MPC basis. As shown in FIG. 2, an MPC-specific service chain controller calls the FE by way of a control interface whenever new service chains need to be established and when services need need to be cleared. Whenever new SP, DP, or FP instances are made available, the service chain controller programs SPI paths into the relevant FE and informs the load-balancing SPs of the availability of the new service chains.

SP and DP functions may be implemented as virtual data center entities (e.g., StarOS SI or DI) or built from bespoke elements (e.g., Cisco ASR5500 gateway product). An FE may support multiple MPCs simultaneously. Each MPC is created through system orchestration; in particular, the system establishes a presence on the FE by creating an empty VRF, assigns an IP address to the VRF for GTP-traffic, and announces reachability of the IP address for the FE. If the FE needs to be reachable from external networks, the VRF with its served IP address pool is announced towards those networks. A system orchestrator also establishes such parameters.

Once reachability of the FE is established, the FE is brained with a virtual presence of the selected MPC. This means that a basic set of steering records are downloaded into the FIB, if need be fast-path modules are made available to the FE and announced as service chains, and if needed, signaling and data-plane entities are announced and connected to their service chains. To avoid Quality of Service ("QoS") crosstalk, which is the performance effect one MPC can have on another by hogging resources, proper resource isolation between the MPCs is required. The shared element here is the FE. To avoid such crosstalk, memory and CPU resources are pre-allocated to each MPC FP and enforced. To avoid overload of ingress networks, each MPC domain may be rate limited. Once virtual presence of a MPC is established, the MPC can field calls.

Figure 4:
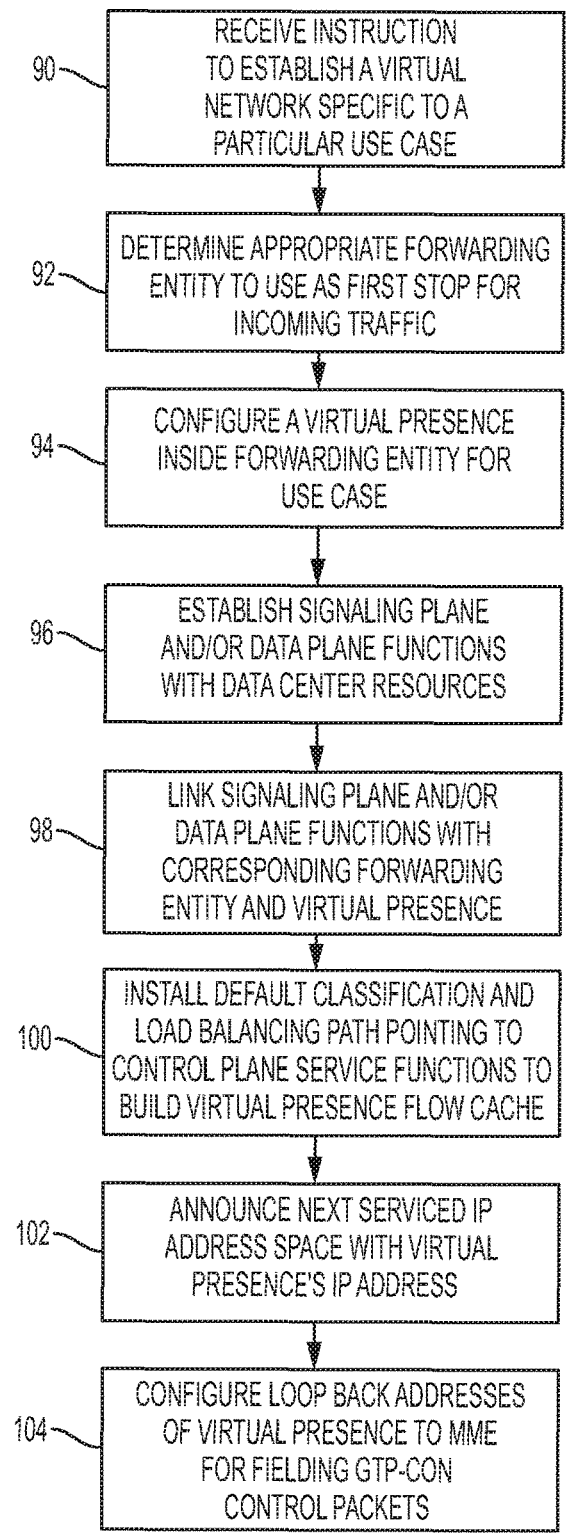
FIG. 4 is a flowchart illustrating a technique implemented by a configuration manager for setting up a segregated data path in accordance with embodiments described herein for implementing multi-mobile core networks and value added services.

Referring now to FIG. 4, illustrated herein is a flowchart illustrating a technique implemented by a configuration manager for setting up a segregated data path. In step 90, the configuration manager receives from the operator an instruction to establish a virtual network (e.g., a network slice) specific to a particular use case. The instruction may arrive in the form of a service model that describes in abstract terms what kind of mobile packet core needs to be deployed. In step 92, the configuration manager determines the appropriate FE to use as a first stop for traffic originating from the access network and/or the internet. Selection criteria may include availability of attachment circuits to the access networks and Internet and/or enterprise networks, availability of forwarding capacity on the FE itself if needed, availability of FP functions on the FE itself (it will be assumed herein that FP functions operate like standard DP functions. If needed, multiple Fes may be allocated and used in combination with Layer 3 standard load distribution techniques (e.g., ECMP and/or IP address fragmentation with next hop routing).

In step 94, the configuration manager configures inside the FE a virtual presence (i.e., a VRF) for the use case. This step includes, if needed, installing plugin functions to support required DP functions (e.g., large flow tables, NSH, vPATH, GTP, GRE, etc.) to prepare the FE for the use case's service, and preparing data structures to provide flow classification (e.g., flow tables) for GTP packets (GTP-C or GTP-U) by way of their TEID. This step also includes preparation of attachment circuits to enable connectivity toward access and Internet and/or enterprise networks and allocation of a private loopback address to be used inside F-TEIDs for this specific VRF, unique within the attachment circuit used to communicate to access networks and/or Internet and/or enterprise networks. The attachment circuit to the access system may or may not be the same as that connecting the FE to the Internet and/or enterprise networks. In step 96, SP and/or DP functions (or entries) (as shown in FIGS. 2 and 3) are established with data center resources. This step may or may not include split control/user plane functions for handling SP and DP packets. Generally, these are referred to as MPC service functions. These service functions may be dynamically created with ETSI NFV orchestration functions, for example. In step 98, once the appropriate VRFs and service functions are ready, SP and DP service functions are linked to their FE and VRF and service functions are hosted on an NSH-based service chain. In step 100, default classification and load balancing path are installed to point to the control plane service functions to help build the VRF's flow cache. In step 102, the next serviced IP address space is announced by the service function toward the Internet and/or enterprise networks (e.g., next hop routing with or without multipath) with the VRF's IP address. In step 104, FE VRF's loopback addresses to the MME are configured for fielding GTP-C control packets.

Figure 5:
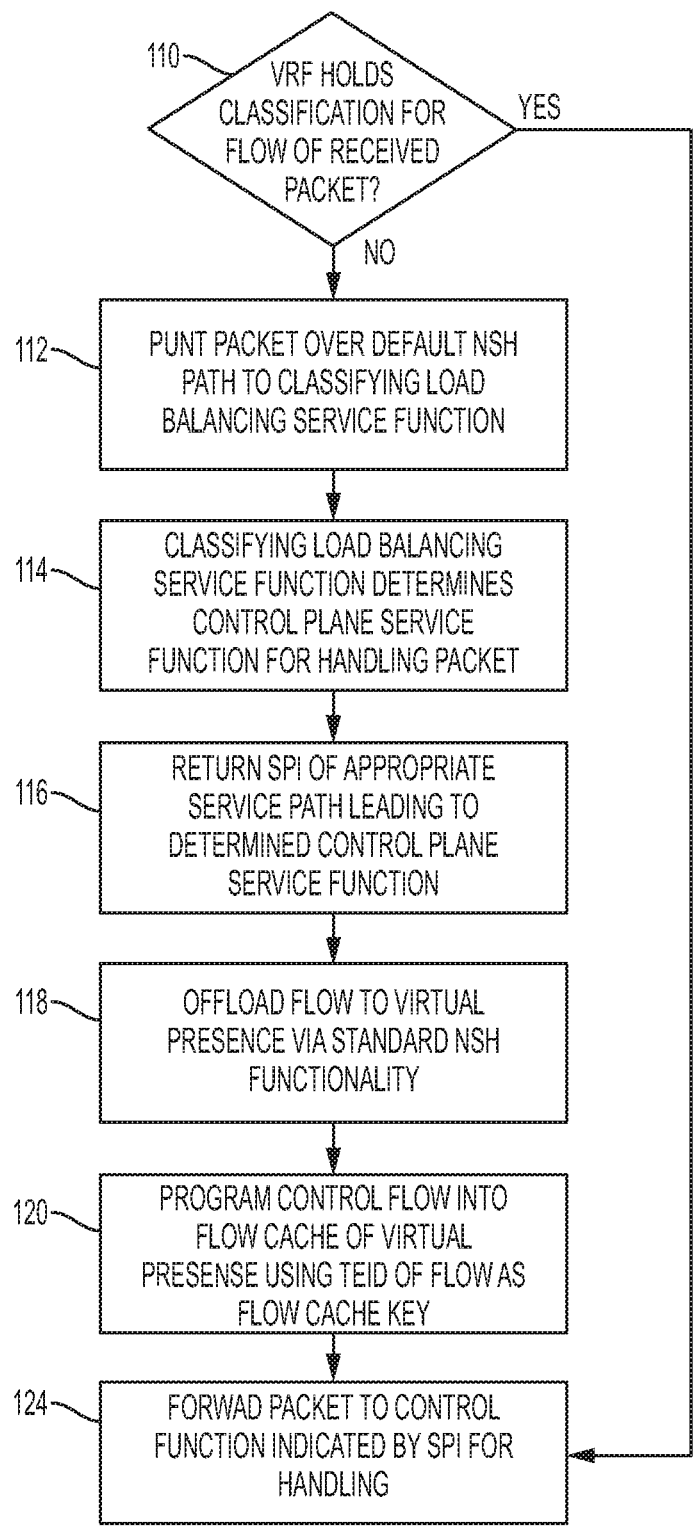
FIG. 5 is a flowchart illustrating steps that may be performed when a control packet arrives at the VRF in accordance with embodiments described herein for implementing multi-mobile core networks and value added services.

FIG. 5 is a flowchart illustrating steps that may be performed at a VRF when a control packet arrives at the VRF. In step 110, a determination is made whether the VRF holds a classification for the flow. If a negative determination is made in step 110, in step 112, the packet is "punted" over a default NSH path for classification purposes to a classifying load balancing service function. The control plane service function and the classifying load balancing service function may or may not be located at the same entity. In step 114, the classifying load balancing service function makes a decision as to which control plane service function needs to support the control packet and in step 115, returns the SPI of the appropriate service path leading to the respective control plane service function. In step 116, the classifying load balancing service function then offloads the flow to the FE's VRF through standard NSH functions, meaning that the subsequent packets are not first routed to the classifying load balancing service function but are directly forwarded onto the appropriate service chain toward the control plane service function. In step 118, the VRF's flow cache is used to program the control flow into the VRF's flow cache using the flow's TEID as flow cache key. In step 120, the VRF forwards the packet to the appropriate control function by its SPI. If a positive determination is made in step 110, in step 124 the packet is directly routed to the appropriate control service function.

The same technique illustrated in FIG. 5 is used for data plane functions ("GTP-U"). When the first user plane packet arrives at the VRF, the classifying load balancing service function determines how to route the packet to the appropriate DP (or FP) service function. The DP (or FP) service function handles the packet and returns the packet to the VRF for forwarding to the Internet or enterprise network. Network originated packets first find their way to the FE's VRF when routed form the Internet or enterprise network, are matched against the flow cache, and, if the flow is not found in the cache, are first classified by the classifying load balancer service function. The packet is then sent to the end of the service chain for DP service (e.g., minimally, a GTP-U header is added to the packet). Once the packet finds its way back to the FE's VRF, it is sent toward the access network using F-TEID routing. The first control plane function finds its way to the control plane service function by the MME making a decision which FE and VRF to address.

In the case of any of the service functions linked to a VRF hosted by an FE becoming unavailable (e.g., fails), the SPIs in the FE VRFs toward the SP and/or DP functions are deconfigured by the configuration manager. By deconfiguring the SPIs in the VRF, the flow cache of the cache flow mappings held by the VRF are purged. Next, when new packets arrive in the system, the VRF may use its default path to the classifying load balancing service function to obtain new SPI information for the flow. In case the path to the classifying load balancer becomes unavailable, the configuration manager may provision replacement paths. In case the FE itself becomes unavailable, meaning that the VRFs thereof are not addressable anymore, a backup VRF can assume the role of the primary VRF, announcing that it is serving the appropriate loopback address. Configuration of this is managed through the configuration manager.

Embodiments described herein present a mechanism for a split control-/data-plane system with a separable and shareable FE across one or more MPCs. The FE can be shared across many MPCs each with their own SP and DP functions. For fast-path connectivity, FP functions can be used directly on the FE itself. It goes that each MPC anchored on the FE may use its own FP, SP and DP components and proper resource isolation avoid QoS crosstalk. In other words: the FE is virtualized and multiplexed across multiple MPCs and use cases.

All connectivity between FE, FP, SP and DP components is based on IETF SFC service chaining, and to further optimize service delivery FP and DP components can be mixed and matched at will. Creation of MPC and use cases are controlled by an orchestration system, while individual bearer and flow routing is under control of the MPC itself. For the latter, MPCs can download steering policy records into the FE. To aid classification, SPs can download policy steering records into the FE.

Embodiments described herein for implementing a split control/data plane with a separate FE, FP, SP and DP functions hosted on NSH-based service chains enable a variety of features, including support for independent FE that can be hosted by a separate entity, support for multiple MPCs each with separable SP and DP functions, support for FP functions in side an FE for optimized data-plane performance capabilities, support for mixing functions on the FP and slow-path DP through NSH-based service chaining, and offloading of classification decisions into FE for optimized classification decisions.

Figure 6:
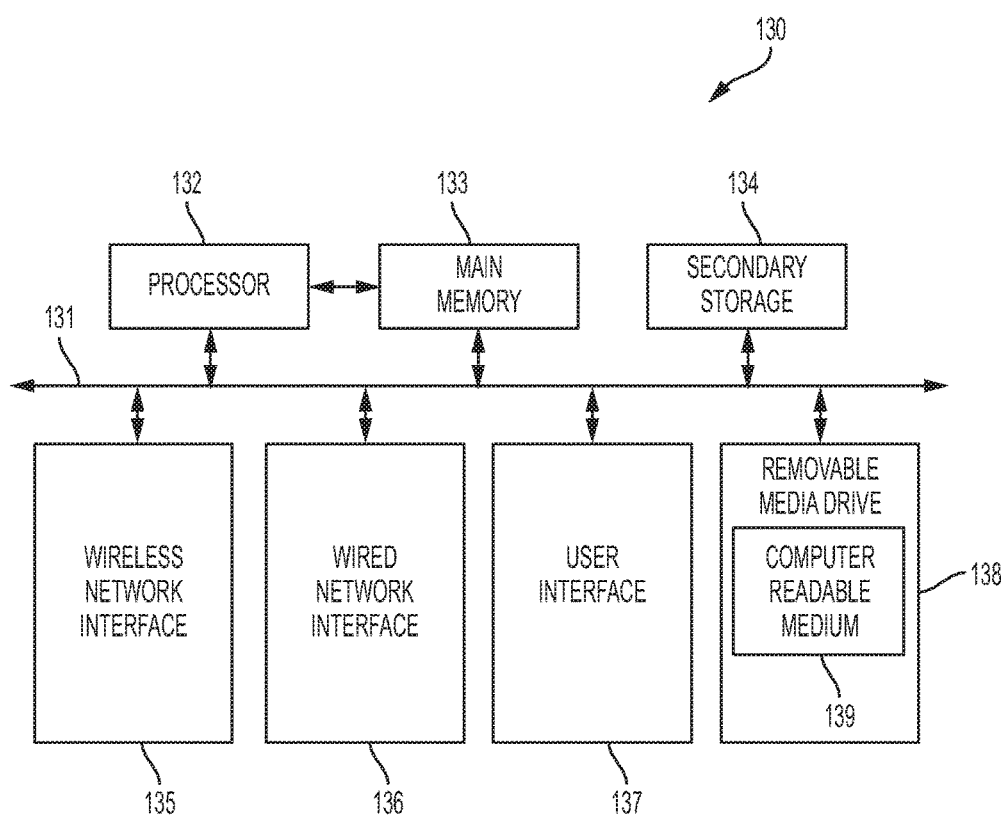
FIG. 6 is a simplified block diagram of a machine comprising an element of a communications network in which techniques for implementing multi-mobile core networks and value added services in accordance with embodiments described herein may be implemented.

Turning to FIG. 6, FIG. 6 illustrates a simplified block diagram of an example machine (or apparatus) 130, which in certain embodiments may be a classifier or a forwarding element, that may be implemented in embodiments described herein. The example machine 130 corresponds to network elements and computing devices that may be deployed in a communications network, such as a classifier or a forwarding element. In particular, FIG. 6 illustrates a block diagram representation of an example form of a machine within which software and hardware cause machine 130 to perform any one or more of the activities or operations discussed herein. As shown in FIG. 6, machine 130 may include a processor 132, a main memory 133, secondary storage 134, a wireless network interface 135, a wired network interface 136, a user interface 137, and a removable media drive 138 including a computer-readable medium 139. A bus 131, such as a system bus and a memory bus, may provide electronic communication between processor 132 and the memory, drives, interfaces, and other components of machine 130.

Processor 132, which may also be referred to as a central processing unit ("CPU"), can include any general or special-purpose processor capable of executing machine readable instructions and performing operations on data as instructed by the machine readable instructions. Main memory 133 may be directly accessible to processor 132 for accessing machine instructions and may be in the form of random access memory ("RAM") or any type of dynamic storage (e.g., dynamic random access memory ("DRAM")). Secondary storage 134 can be any non-volatile memory such as a hard disk, which is capable of storing electronic data including executable software files. Externally stored electronic data may be provided to computer 130 through one or more removable media drives 138, which may be configured to receive any type of external media such as compact discs ("CDs"), digital video discs ("DVDs"), flash drives, external hard drives, etc.

Wireless and wired network interfaces 135 and 136 can be provided to enable electronic communication between machine 130 and other machines, or nodes. In one example, wireless network interface 135 could include a wireless network controller ("WNIC") with suitable transmitting and receiving components, such as transceivers, for wirelessly communicating within a network. Wired network interface 136 can enable machine 130 to physically connect to a network by a wire line such as an Ethernet cable. Both wireless and wired network interfaces 135 and 136 may be configured to facilitate communications using suitable communication protocols such as, for example, Internet Protocol Suite ("TCP/IP"). Machine 130 is shown with both wireless and wired network interfaces 135 and 136 for illustrative purposes only. While one or more wireless and hardwire interfaces may be provided in machine 130, or externally connected to machine 130, only one connection option is needed to enable connection of machine 130 to a network.

A user interface 137 may be provided in some machines to allow a user to interact with the machine 130. User interface 137 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 138 represents a drive configured to receive any type of external computer-readable media (e.g., computer-readable medium 139). Instructions embodying the activities or functions described herein may be stored on one or more external computer-readable media. Additionally, such instructions may also, or alternatively, reside at least partially within a memory element (e.g., in main memory 133 or cache memory of processor 132) of machine 130 during execution, or within a non-volatile memory element (e.g., secondary storage 134) of machine 130. Accordingly, other memory elements of machine 130 also constitute computer-readable media. Thus, "computer-readable medium" is meant to include any medium that is capable of storing instructions for execution by machine 130 that cause the machine to perform any one or more of the activities disclosed herein.

Not shown in FIG. 6 is additional hardware that may be suitably coupled to processor 132 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 130 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 130 to appropriately manage the operation of the hardware components therein.

The elements, shown and/or described with reference to machine 130, are intended for illustrative purposes and are not meant to imply architectural limitations of machines such as those utilized in accordance with the present disclosure. In addition, each machine may include more or fewer components where appropriate and based on particular needs. As used in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein (e.g., in FIGS. 4 and 5) may be implemented in software. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

In one example implementation, classifier and forwarding elements, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 133, secondary storage 134, computer-readable medium 139) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 132) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM"), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving a packet associated with a flow at a network element configured to perform both a control-plane function and a data-plane function for the packet;
   determining whether a flow cache of the network element includes an entry for the flow indicating a classification for the flow;
   in response to determining that the network element flow cache does not include an entry for the flow:
      punting the packet over a default path to a classifying service function, wherein the classifying service function classifies the flow and determines a service function for handling the flow, wherein the determined service function is a control plane service function when the packet is associated with the control-plane function and the determined service function is a data plane service function when the packet is associated with the data-plane function;
      receiving from the classifying service function a service path identifier ("SPI") of a service path leading to the determined service function; and
      wherein the flow is offloaded from the classifying service function to the network element.

2. The method of claim 1 further comprising forwarding the packet to the determined service function.

3. The method of claim 1 further comprising forwarding subsequent packets associated with the flow directly to the determined service function.

4. The method of claim 1 further comprising programming the flow cache to include an entry indicating the classification for the flow, wherein the entry includes the SPI of the service path leading to the determined service function.

5. The method of claim 4, wherein a key to the cache flow comprises a Tunnel Endpoint Identifier ("TEID") of the flow.

6. The method of claim 1, wherein if the cache flow contains an entry for the flow, forwarding the packet to a service function indicated by an SPI contained in the entry.

7. The method of claim 1, wherein the network element comprises a Virtual Routing and Forwarding element ("VRF").

8. One or more non-transitory tangible media having encoded thereon logic that includes code for execution and when executed by a processor is operable to perform operations comprising:
   receiving a packet associated with a flow at a network element configured to perform both a control-plane function and a data-plane function for the packet;
   determining whether a flow cache of the network element includes an entry for the flow indicating a classification for the flow;
   in response to determining that the network element flow cache does not include an entry for the flow:
      punting the packet over a default path to a classifying service function, wherein the classifying service function classifies the flow and determines a service function for handling the flow, wherein the determined service function is a control plane service function when the packet is associated with the control-plane function and the determined service function is a data plane service function when the packet is associated with the data-plane function;
      receiving from the classifying service function a service path identifier ("SPI") of a service path leading to the determined service function; and
      wherein the flow is offloaded from the classifying service function to the network element.

9. The media of claim 8, wherein the operations further comprise forwarding the packet to the determined service function.

10. The media of claim 8, wherein the operations further comprise forwarding subsequent packets associated with the flow directly to the determined service function.

11. The media of claim 8, wherein the operations further comprise programming the flow cache to include an entry indicating the classification for the flow, wherein the entry includes the SPI of the service path leading to the determined service function.

12. The media of claim 11, wherein a key to the cache flow comprises a Tunnel Endpoint Identifier ("TEID") of the flow.

13. The media of claim 8, wherein if the cache flow contains an entry for the flow, forwarding the packet to a service function indicated by an SPI contained in the entry.

14. An apparatus comprising:
   a memory element configured to store data;
   a processor operable to execute instructions associated with the data; and
   a forwarding element ("FE") configured to:
      receive a packet associated with a flow at a network element configured to perform both a control-plane function and a data-plane function for the packet;
      determine whether a flow cache of the network element includes an entry for the flow indicating a classification for the flow;
      in response to determining that the network element flow cache does not include an entry for the flow:
         punt the packet over a default path to a classifying service function, wherein the classifying service function classifies the flow and determines a service function for handling the flow, wherein the determined service function is a control plane service function when the packet is associated with the control-plane function and the determined service function is a data plane service function when the packet is associated with the data-plane function;

receive from the classifying service function a service path identifier ("SPI") of a service path leading to the determined control plane service function; and wherein the flow is offloaded from the classifying service function to the network element.

15. The apparatus of claim 14, wherein the FE is further configured to forward the packet to the determined service function.

16. The apparatus of claim 14, wherein the FE is further configured to forward subsequent packets associated with the flow directly to the determined service function.

17. The apparatus of claim 14, wherein the FE is further configured to program the flow cache to include an entry indicating the classification for the flow, wherein the entry includes the SPI of the service path leading to the service function.

18. The apparatus of claim 17, wherein a key to the cache flow comprises a Tunnel Endpoint Identifier ("TEID") of the flow.

19. The apparatus of claim 14, wherein if the cache flow contains an entry for the flow, forwarding the packet to a service function indicated by an SPI contained in the entry.

20. The apparatus of claim 14, wherein the network element comprises a Virtual Routing and Forwarding element ("VRF").

* * * * *